United States Patent [19]
Kobayashi et al.

[11] Patent Number: 6,072,016
[45] Date of Patent: Jun. 6, 2000

[54] SILPHENYLENE POLYMER AND COMPOSITION CONTAINING SAME

[75] Inventors: Hideki Kobayashi; Tooru Masatomi, both of Chiba Prefecture, Japan

[73] Assignee: Dow Corning Toray Silicone Co., Ltd., Tokyo, Japan

[21] Appl. No.: 09/181,508

[22] Filed: Oct. 28, 1998

[30] Foreign Application Priority Data

Dec. 29, 1997 [JP] Japan .................................. 9-369563
Dec. 29, 1997 [JP] Japan .................................. 9-369564

[51] Int. Cl.$^7$ .................................................. C08G 77/08
[52] U.S. Cl. .............................. 528/15; 525/477; 528/17; 528/18; 528/24; 528/35; 528/43
[58] Field of Search ................................ 528/34, 43, 17, 528/18, 15, 24; 525/477

[56] References Cited

U.S. PATENT DOCUMENTS 3,398,175  8/1968  Leitheiser ................................... 528/35
5,976,703  11/1999  Nakata et al. ........................... 428/447

FOREIGN PATENT DOCUMENTS 4-325524  11/1992  Japan .
6-41508  2/1994  Japan .

*Primary Examiner*—Robert Dawson
*Assistant Examiner*—Jeffrey B. Robertson
*Attorney, Agent, or Firm*—Larry A. Milco

[57] ABSTRACT

A silphenylene polymer having the general formula:

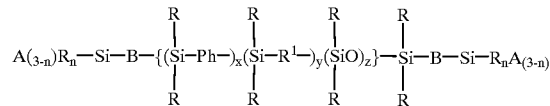

wherein each R is independently a monovalent hydrocarbon group free of aliphatic unsaturation and having 1 to 10 carbon atoms; Ph is a substituted or unsubstituted phenylene group; $R^1$ is an alkylene group having 2 to 10 carbon atoms or an alkyleneoxyalkylene group; A is a hydrolyzable group or a hydroxy group; B is an alkylene group having 2 to 10 carbon atoms, an alkyleneoxyalkylene group, or an oxygen atom; n is an integer from 0 to 2; x is an integer having a value of at least 1; y is an integer having a value of at least 0; and z is an integer having a value of at least 0.

19 Claims, No Drawings

SILPHENYLENE POLYMER AND COMPOSITION CONTAINING SAME

FIELD OF THE INVENTION

The present invention relates to a silphenylene polymer and more specifically to a silphenylene polymer having terminal hydrolyzable groups or hydroxy groups and to methods for the preparation thereof. The present invention also relates to a curable composition comprising the silphenylene polymer and to a method of preparing same.

BACKGROUND OF THE INVENTION

Silphenylenes which have alkoxy groups on both terminals of the molecular chains include, for example, the compound expressed by the formula $(CH_3O)_3Si$—$C_6H_4$—$Si(OCH_3)_3$ (see Japanese Patent Application Kokai No. 6-41508). Furthermore, polymers consisting of silphenylene units and silethylene units include a polymer consisting of units expressed by the formula:

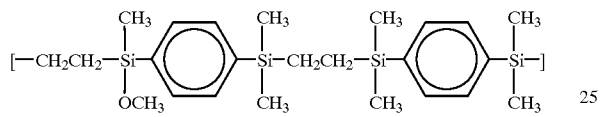

(see Japanese Patent Application Kokai No. 4-325524).

A composition consisting of an organopolysiloxane resin and two types of alkoxysilanes is known as a curable silicone composition which is cured at room temperature to form a coating film (see Japanese Patent Application Kokai No. 51-148749). Furthermore, a composition consisting of an organopolysiloxane resin, an α,ω-dihydroxydiorganosiloxane and an organosilane is known as a curable silicone composition which forms a cured coating film with water-repellent properties (Japanese Patent Application Kokai No. 55-48245). However, it cannot be said that these compositions have good curability; furthermore, these compositions suffer from the drawback of inferior storage stability. Moreover, in the case of these compositions, multiple coats are required in order to form a thick coating film.

SUMMARY OF THE INVENTION

The present invention is directed to a silphenylene polymer having the general formula:

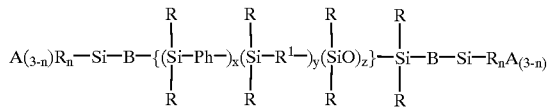

wherein each R is independently a monovalent hydrocarbon group free of aliphatic unsaturation and having 1 to 10 carbon atoms; Ph is a substituted or unsubstituted phenylene group; $R^1$ is an alkylene group having 2 to 10 carbon atoms or an alkyleneoxyalkylene group; A is a hydrolyzable group or a hydroxy group; B is an alkylene group having 2 to 10 carbon atoms, an alkyleneoxyalkylene group, or an oxygen atom; n is an integer from 0 to 2; x is an integer having a value of at least 1; y is an integer having a value of at least 0; and z is an integer having a value of at least 0.

The present invention is also directed to methods of preparing a silphenylene polymer and to a method of preparing a curable composition which comprises:

(A) 100 parts by weight of the silphenylene polymer described above;

(B) 1 to 90 parts by weight of an organosilane selected from the group consisting of an organosilane having the general formula $R^2_e SiY_{4-e}$ and partially hydrolyzed condensates thereof, wherein each $R^2$ is independently a monovalent hydrocarbon group, Y is a hydrolyzable group, and e is an integer from 0 to 2; and (C) a cure accelerating catalyst in an amount sufficient to cure the composition.

The present invention is still further directed to a method of preparing a curable composition containing the silphenylene polymer.

DETAILED DESCRIPTION OF THE INVENTION

The silphenylene polymer of component (A) is the main component of the curable composition of the present invention. This polymer is expressed by the following general formula:

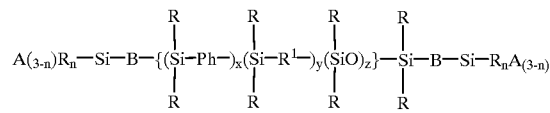

In the above formula, R denotes a substituted or unsubstituted monovalent hydrocarbon group with 1 to 10 carbon atoms which contains no aliphatic unsaturated bonds. Concrete examples of such groups include alkyl groups such as methyl, ethyl, propyl, butyl, pentyl, and hexyl groups, etc.; aryl groups such as phenyl, tolyl, and xylyl, etc.; aralkyl groups such as benzyl and phenethyl, etc.; and fluorinated hydrocarbon groups such as trifluoropropyl, nonafluorohexyl, and heptadecafluorooctyl groups, etc. Ph denotes a substituted or unsubstituted phenylene group; concrete examples of such groups include p-phenylene, m-phenylene, o-phenylene, 2-methyl-1,4-phenylene, and 2-methoxy-1,4-phenylene. Among these groups, p-phenylene is especially desirable. $R^1$ denotes an alkylene group with 2 to 10 carbon atoms or an alkyleneoxyalkylene group. Concrete examples of alkylene groups which can be used include linear or branched alkylene groups such as ethylene, methylethylene, ethylethylene, propylethylene, butylethylene, propylene, butylene, 1-methylpropylene, pentylene, hexylene, heptylene, octylene, nonylene, and decylene, etc. Among these groups, ethylene, propylene, butylene, and hexylene are especially desirable. Furthermore, examples of alkyleneoxyalkylene groups which can be used as $R^1$ include ethyleneoxypropylene and ethyleneoxybutylene. A indicates a hydrolyzable group or a hydroxy group. Examples of hydrolyzable groups which can be used include diorganoketoxime groups such as dimethylketoxime and methylethylketoxime, etc.; alkoxy groups such as methoxy and ethoxy, etc.; acyloxy groups such as acetoxy, etc.; organoamino groups such as N-butylamino, etc.; organoacylamido groups such as methylacetamido, etc.; N,N-diorganohydroxyamino groups such as N,N-diethylhydroxyamino, etc.; and alkenyloxy groups such as propenoxy, etc. B indicates an alkylene group with 2 to 10 carbon atoms, an alkylenoxyalkylene group or an oxygen atom. The same groups cited for $R^1$ above may be cited as examples of such alkylene groups or alkyleneoxyalkylene groups. n is an integer from 0 to 2. x is an integer greater than or equal to 1, and is preferably in the range of 3 to 3,000. y and z are each integers greater than or equal to 0;

in particular, it is desirable that (y+z) be an integer greater than or equal to 1, and a value in the range of 1 to 3,000 is even more desirable.

The polymers expressed by the following formulae may be cited as examples of silphenylene polymers suitable for use as component (A). In the following formulae, Ph indicates a p-phenylene group, Me indicates a methyl group, and $C_6H_5$ indicates a phenyl group.

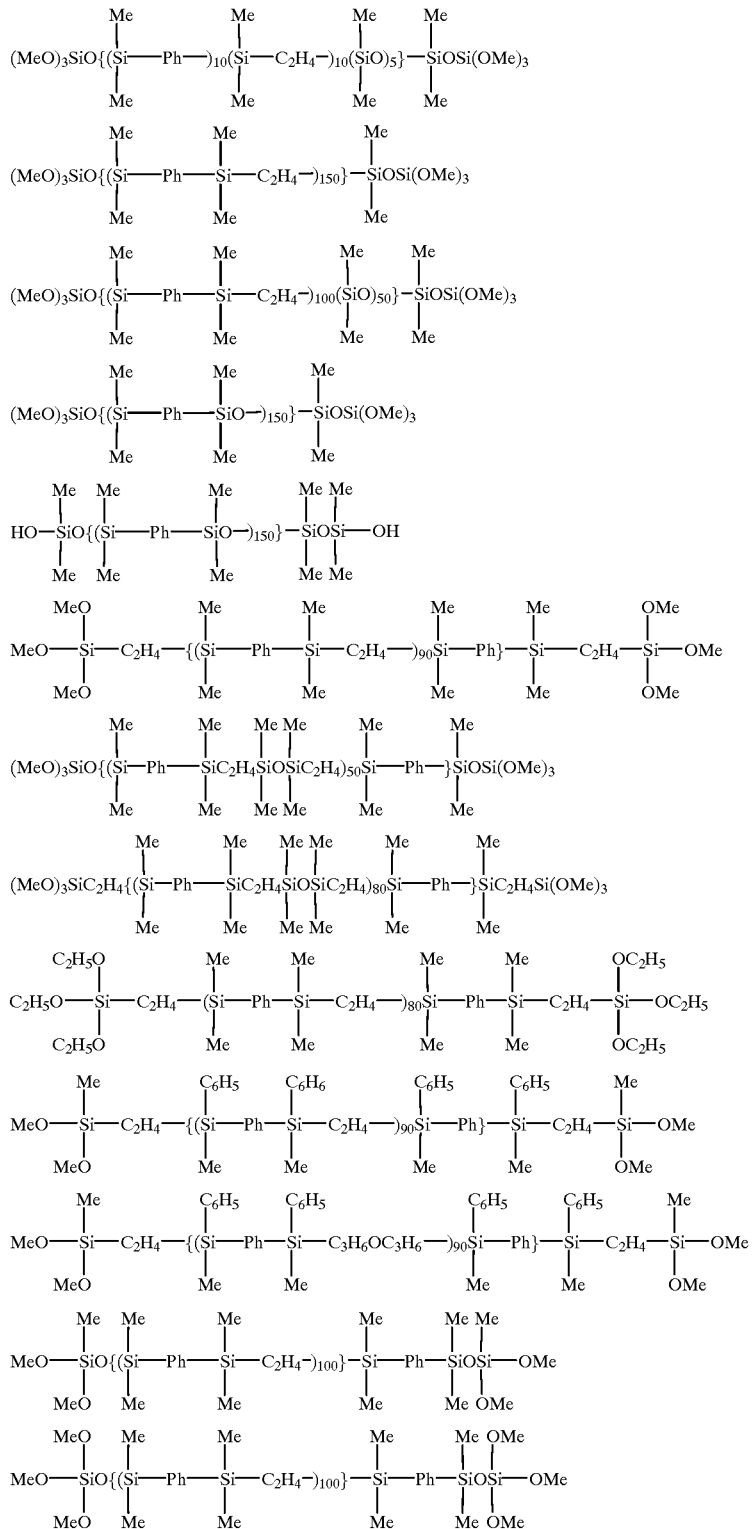

-continued

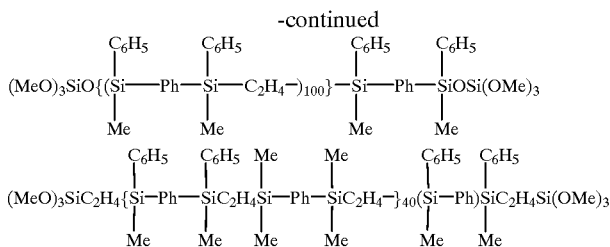

The silphenylene polymer of the present invention can be prepared by several methods, including those described below. For, example, a silphenylene polymer having terminal hydroxy groups can be obtained by the co-hydrolysis of a disilylphenylene expressed by the formula:

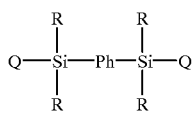

and a disilyl compound expressed by the formula:

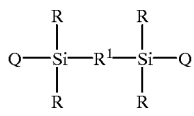

wherein R, Ph, and $R^1$ have the same meanings as described above and Q is selected from the group consisting of hydroxy groups, hydrogen atoms, halogen atoms and the hydrolyzable groups defined above for A.

Furthermore, a silphenylene polymer having terminal groups expressed by the general formula $A_{(3-n)}R_nSi-B-$, wherein A, R and n have the same meanings as described above and B is an oxygen atom, can be obtained by reacting the silphenylene polymer produced from the immediately preceding method with a large excess of a silane compound having the general formula $A_{(4-n)}R_nSi$, and then stripping the excess silane compound.

Another method of preparing a silphenylene polymer according to the present invention comprises polymerizing a silane compound having the general formula $A_{(3-n)}R_nSi-R^3$, a disilylphenylene having the formula:

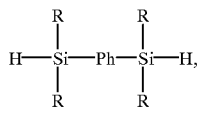

and a disiloxane having the formula:

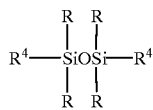

in the presence of a catalyst selected from the group consisting of a hydrosilylation catalyst and a peroxide, wherein A, R, Ph and n have the same meanings as described above; and $R^3$ is an alkenyl group with 2 to 10 carbon atoms, an alkenyloxyalkylene group, or a hydrogen atom; and $R^4$ is an alkenyl group with 2 to 10 carbon atoms or an alkenyloxyalkylene group.

A further method of preparing a silphenylene polymer of the present invention comprises polymerizing a silane compound having the general formula $A_{(3-n)}R_nSi-R^3$, a disilylphenylene expressed by the formula:

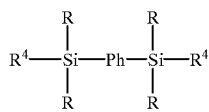

and a disiloxane expressed by the formula:

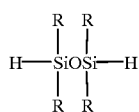

in the presence of a catalyst selected from the group consisting of a hydrosilylation catalyst and a peroxide, wherein R, Ph, and $R^4$ have the same meanings as described above.

A further method of preparing a silphenylene polymer of the present invention comprises polymerizing an alkoxysilane expressed by the general formula:

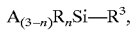

a disilylphenylene expressed by the formula:

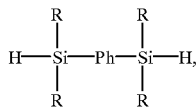

and a disilylphenylene expressed by the formula:

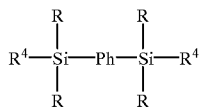

in the presence of a catalyst selected from the group consisting of a hydrosilylation catalyst and a peroxide; wherein A, R, n, Ph, $R^3$, and $R^4$ have the same meanings as described above.

In the preceding methods, the hydrosilylation catalyst can be a platinum type catalyst, a supported platinum type catalyst or a peroxide, etc. Following polymerization, it is desirable that platinum type catalysts be adsorbed by adding and mixing active carbon, a silica gel, an aminosilane-treated silica gel or a mercaptosilane-treated silica gel, etc., and that said catalysts then be removed by filtration.

Component (B) of the present invention is an organosilane expressed by the general formula $R^2_e SiY_{4-e}$ or a partially hydrolyzed condensate of the same. This component performs an action which causes curing of the composition of the present invention at room temperature, and is ordinarily called a "cross-linking agent". In the above formula, $R^2$ indicates a substituted or unsubstituted monovalent hydrocarbon group; examples of such groups include the same groups as those indicated for the aforementioned R. Y indicates a hydrolyzable group; examples of such groups include diorganoketoxime groups such as dimethylketoxime and methylethylketoxime, etc.; alkoxy groups such as methoxy and ethoxy, etc.; acyloxy groups such as acetoxy, etc.; organoamino groups such as N-butylamino, etc.; organoacylamido groups such as methylacetamido, etc.; N,N-diorganohydroxyamino groups such as N,N-diethylhydroxyaamino, etc.; and alkenyloxy groups such as propenoxy, etc. e is an integer from 0 to 2, and is preferably 1. Such organosilanes or partially hydrolyzed condensates of the same may be used singly as the present component, or mixtures consisting of two or more such compounds may be used. The amount of the present component that is mixed with the composition is in the range of 1 to 90 parts by weight, and preferably in the range of 1 to 60 parts by weight, per 100 parts by weight of component (A).

The cure accelerating catalyst constituting component (C) used in the composition of the present invention is used in order to accelerate the curing of the composition of the present invention. Ordinarily, condensation reaction catalysts used in the dehydration condensation of silanol groups can be effectively used as this catalyst. Concrete examples of such catalysts include tin salts of carboxylic acids such as dibutyltin diacetate, dibutyltin dilaurate, dibutyltin dioctoate, stannous octoate, stannous napthenate, stannous oleate, stannous isobutyrate, stannous linolate, stannous stearate, stannous benzolate, stannous naphthoate, stannous laurate, stannous o-thymate, stannous β-benzoylpropionate, stannous crotonate, stannous tropate, stannous p-bromobenzoate, stannous palmitooleate, stannous cinnamate and stannous phenylacetate, etc.; iron salts, manganese salts or cobalt salts of such carboxylic acids; complex salts such as tetraalkyltitanates or dialkyltitanates; and organosiloxytitanates. The concentration of this component is sufficient to accelerate curing of the present composition; ordinarily, this amount is in the range of 0.0001 to 10 parts by weight per 100 parts by weight of component (A).

The composition of the present invention may further comprise a silane coupling agent to improve the adhesion of the composition to various types of substrates. Examples of silane coupling agents suitable for use in the present composition include:

$NH_2CH_2CH_2Si(OC_2H_5)_3$ $NH_2CH_2CH_2NH(CH_2)_3Si(OCH_3)_3$

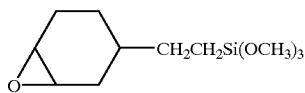

$CH_2{=}CHSi(OCH_3)_3$ $CH_2{=}CHSi(OC_2H_5)_3$

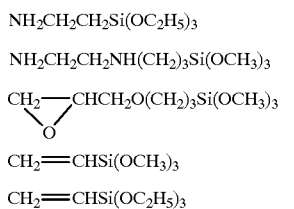

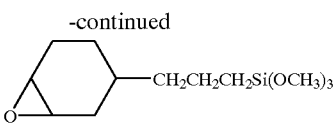

These silane coupling agents may be used individually or in mixtures consisting of two or more coupling agents. It is desirable that the amount added be in the range of 0.01 to 10 wt % relative to the composition of the present invention.

Furthermore, it is desirable that the composition of the present also contain an organic solvent. Examples of organic solvents which can be used include aromatic solvents such as benzene, toluene and xylene, etc.; aliphatic solvents such as cyclohexane, methylcyclohexane and dimethylcyclohexane, etc.; chlorine type solvents such as trichloroethylene, 1,1,1-trichloroethane, carbon tetrachloride and chloroform, etc.; aliphatic saturated hydrocarbon type solvents such as hexane and industrial gasoline, etc.; ethers such as diethyl ether and tetrahydrofuran, etc.; ketone type solvents such as methyl isobutyl ketone, etc.; fluorine type solvents such as $\alpha,\alpha,\alpha$-trifluorotoluene and hexafluoroxylene, etc.; and volatile silicones such as hexamethyldisiloxane, hexamethylcyclotrisiloxane and octamethylcyclotetrasiloxane, etc. When such organic solvents are added, it is desirable that the amount added be such that the concentration of the composition of the present invention is 5 to 90 wt %.

The composition of the present invention can be prepared by uniformly mixing the abovementioned components (A) through (C) in the absence of moisture. There are no particular restrictions on the order in which the components are mixed; however, in cases where the silphenylene polymer of component (A) is a solid, it is desirable to first dissolve this component in an organic solvent before mixing it with the other components. Examples of organic solvents that can be used to dissolve component (A) are the same as those listed above for the curable composition.

The curable composition of the present invention described above can be stored for long periods of time in the absence of moisture and cured at room temperature in the presence of moisture to form a high-hardness coating film having superior water-repellent properties, oil-repellent properties, anti-soiling properties, heat resistance, weather resistance, chemical resistance and wear resistance. Furthermore, the curing of the composition can be accelerated by heating. Moreover, the principal chains of the silphenylene polymer of component (A), which is the chief component of the composition of the present invention, are stiff and linear; accordingly, the molecular weight can easily be adjusted, and the viscosity of the solution that is produced when the composition is dissolved in an organic solvent can easily be adjusted compared to conventional network type silicone resins.

EXAMPLES

Below, the present invention will be described in detail in terms of practical examples of application. In the practical examples, Me indicates a methyl group, and $C_6H_5$ indicates a phenyl group.

Reference Example 1

17 g (0.087 mol) of 1,4-bis(dimethylsilyl)phenylene expressed by the formula:

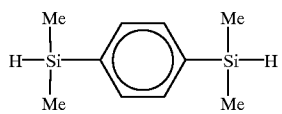

and 30 g of toluene were placed in a flask equipped with an agitator, a thermometer and a condenser. While these ingredients were agitated at 60° C., a solution of a complex of platinum and divinyltetramethyldisiloxane was added so that the platinum metal content of the system was 30 ppm. Next, a mixed solution consisting of 29.3 g (0.079 mol) of 1,4-di(methylphenylvinylsilyl)phenylene expressed by the formula:

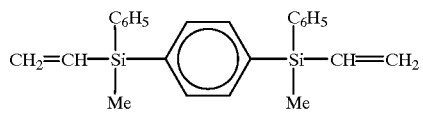

and 30 g of toluene was added to this dropwise, and this mixture was heated to reflux for 2 hours. Next, 4.3 g (0.029 mol) of vinyltrimethoxysilane was added, and the resulting mixture was heated to reflux for an additional hour. Afterward, the volatile component was removed under reduced pressure, thus producing 47 g of a reaction product which was solid at room temperature. The yield of this reaction product was 93%. When the reaction product thus obtained was analyzed by GPC (gel permeation chromatography) using toluene as a solvent, it was found that the weight average molecular weight of the product was 10,000. Furthermore, when this reaction product was analyzed by Fourier transform infrared spectroscopic analysis (FT-IR), $^{13}$C-nuclear magnetic resonance spectroscopic analysis ($^{13}$C-NMR) and $^{29}$Si-nuclear magnetic spectroscopic analysis ($^{29}$Si-NMR), it was ascertained that this reaction product was a silphenylene polymer closed by terminal trimethoxysilyl groups, which had the chemical structure shown below.

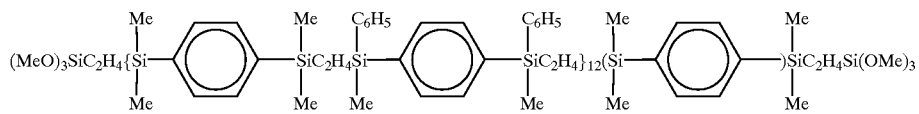

Example 1

3.5 g of the silphenylene polymer obtained in Reference Example 1 was dissolved in 3.5 g of toluene. Afterward, 2 g of methyltri(methylethylketoxime)silane and 0.1 g of dibutyltin diacetate were added and uniformly mixed, thus producing a curable silphenylene polymer composition. When the composition thus obtained was applied to the surface of a smooth glass plate by means of a spin coater, and was then dried, the time required in order to obtain a coating that was dry to the touch was 10 minutes, and a uniform transparent coating film was obtained after 10 minutes had passed. A cured coating film was formed by allowing this sample to stand for 1 week at room temperature. The hardness of the cured coating film thus obtained was 3H in terms of pencil hardness. Furthermore, when the contact angle of this cured coating film with respect to ion exchange water was measured using a contact angle meter, a value of 100 degrees was obtained.

Example 2

3.5 g of the silphenylene polymer obtained in Reference Example 1 was dissolved in 3.5 g of toluene. Afterward, 2 g of methyltrimethoxysilane, 0.3 g of γ-(2-aminoethyl) aminopropyltrimethoxysilane and 0.1 g of dibutyltin diacetate were added and uniformly mixed, thus producing a curable silphenylene polymer composition. When the composition thus obtained was applied to the surface of a smooth glass plate by means of a spin coater, and was then heated for 30 minutes at 150° C., a uniform transparent cured coating film was obtained. The pencil hardness of this cured coating film was 4H. Furthermore, when this curable silphenylene polymer composition was allowed to stand for 3 months at room temperature in the absence of moisture, the storage stability was good, with no gelation occurring even after 3 months had passed.

Comparative Example 1

A curable silicone resin composition was prepared in the same manner as in Example 2, except that a mixture consisting of 2.8 g of a methylpolysiloxane resin comprising 80 mol % methylsiloxane units and 20 mol % dimethylsiloxane units (content of hydroxy groups bonded to silicon atoms: 0.9 wt %) and 0.7 g of a partial hydrolyzate of methyltrimethoxysilane (content of methoxy groups bonded to silicon atoms: 32%) was used instead of 3.5 g of the silphenylene polymer obtained in Reference Example 1. When the composition thus obtained was allowed to stand for 3 months in the absence of moisture, gelation occured after 3 months had elapsed; as a result, it was ascertained that the storage stability of the composition was low.

In the curable silphenylene polymer composition of the present invention, a linear silphenylene polylmer which has hydrolyzable groups or hydroxy groups on the terminals is used as the chief component. Accordingly, a high-hardness coating film which is superior in terms of water-repellent properties can be formed by curing the composition at room temperature or under heating in the presence of moisture. Furthermore, the composition of the present invention is characterized by a superior storage stability at room temperature in the absence of moisture.

What is claimed is:

1. A silphenylene polymer having the general formula:

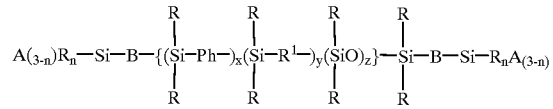

wherein each R is independently a monovalent hydrocarbon group free of aliphatic unsaturation and having 1 to 10 carbon atoms; Ph is a substituted or unsubstituted phenylene group; $R^1$ is an alkylene group having 2 to 10 carbon atoms or an alkyleneoxyalkylene group; A is a hydrolyzable group or a hydroxy group; B is an alkylene group having 2 to 10 carbon atoms or an alkyleneoxyalkylene group; n is an integer from 0 to 2; x is an integer having a value of at least 1; y is an integer having a value of at least 0; and z is an integer having a value of at least 0.

2. The polymer according to claim 1, wherein Ph is para-phenylene.

3. The polymer according to claim 1, wherein $R^1$ is ethylene, propylene, butylene, or hexylene; and x is an integer having a value from 3 to 3,000, and y+z is an integer having a value of at least 1.

4. A method of preparing a silphenylene polymer, said method comprising the step of co-hydrolyzing a disilylphenylene having the formula:

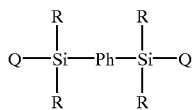

and a disilyl compound having the formula:

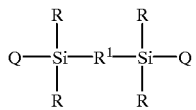

wherein each R is independently a monovalent hydrocarbon group free of aliphatic unsaturation and having 1 to 10 carbon atoms; Ph is a substituted or unsubstituted phenylene group; $R^1$ is an alkylene group having 2 to 10 carbon atoms or an alkyleneoxyalkylene group; and Q is selected from the group consisting of hydroxy groups, hydrogen atoms, halogen atoms, and hydrolyzable groups.

5. A method of preparing a silphenylene polymer, said method comprising the step of polymerizing a silane compound having the general formula $A_{(3-n)}R_nSi-R^3$, a disilylphenylene having the formula:

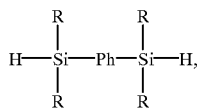

and a disiloxane having the formula:

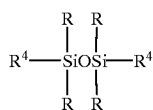

in the presence of a hydrosilylation catalyst, wherein each R is independently a monovalent hydrocarbon group free of aliphatic unsaturation and having 1 to 10 carbon atoms; Ph is a substituted or unsubstituted phenylene group; A is a hydrolyzable group or a hydroxy group; $R^3$ is an alkenyl group having 2 to 10 carbon atoms, an alkenyloxyalkylene group, or a hydrogen atom; $R^4$ is an alkenyl group having 2 to 10 carbon atoms or an alkenyloxyalkylene group; and n is an integer from 0 to 2.

6. The method according to claim 5, wherein the catalyst is a platinum catalyst, further comprising the steps of adding an adsorbent for the platinum catalyst after the polymerizing step and then removing the adsorbent containing the platinum catalyst from the polymer.

7. A method of preparing a silphenylene polymer, said method comprising the step of polymerizing a silane compound having the general formula $A_{(3-n)}R_nSi-R^3$, a disilylphenylene having the formula:

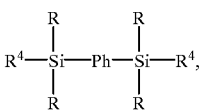

and a disiloxane having the formula:

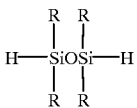

in the presence of a hydrosilylation catalyst, wherein each R is independently a monovalent hydrocarbon group free of aliphatic unsaturation and having 1 to 10 carbon atoms; Ph is a substituted or unsubstituted phenylene group; A is a hydrolyzable group or a hydroxy group; $R^3$ is an alkenyl group having 2 to 10 carbon atoms, an alkenyloxyalkylene group, or a hydrogen atom; $R^4$ is an alkenyl group having 2 to 10 carbon atoms or an alkenyloxyalkylene group; and n is an integer from 0 to 2.

8. The method according to claim 7, wherein the catalyst is a platinum catalyst, further comprising the steps of adding an adsorbent for the platinum catalyst after the polymerizing step and then removing the adsorbent containing the platinum catalyst from the polymer.

9. A method of preparing a silphenylene polymer, said method comprising the step of polymerizing an alkoxysilane having the general formula:

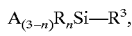

a disilylphenylene having the formula:

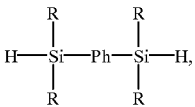

and a disilylphenylene having the formula:

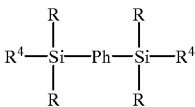

in the presence of a hydrosilylation catalyst, wherein each R is independently a monovalent hydrocarbon group free of aliphatic unsaturation and having 1 to 10 carbon atoms; Ph is a substituted or unsubstituted phenylene group; A is a hydrolyzable group or a hydroxy group; $R^3$ is an alkenyl group having 2 to 10 carbon atoms, an alkenyloxyalkylene group, or a hydrogen atom; $R^4$ is an alkenyl group having 2 to 10 carbon atoms or an alkenyloxyalkylene group; and n is an integer from 0 to 2.

10. The method according to claim 9, wherein the catalyst is a platinum catalyst, further comprising the steps of adding an adsorbent for the platinum catalyst after the polymerizing step and then removing the adsorbent containing the platinum catalyst from the polymer.

11. A curable composition, comprising:

(A) 100 parts by weight of the silphenylene polymer of claim 1;

(B) 1 to 90 parts by weight of an organosilane selected from the group consisting of an organosilane having the formula $R^2_e SiY_{4-e}$ and a partially hydrolyzed condensate thereof, wherein each $R^2$ is independently a monovalent hydrocarbon group, Y is a hydrolyzable group, and e is an integer from 0 to 2; and (C) a cure accelerating catalyst in an amount sufficient to cure the composition.

12. The composition according to claim 11, wherein e has a value of 1.

13. The composition according to claim 11, wherein component (B) is present in an amount from 1 to 60 parts by weight per 100 parts by weight of component (A).

14. The composition according to claim 11, wherein component (C) is a condensation reaction catalyst.

15. The composition according to claim 11, further comprising a silane coupling agent.

16. The composition according to claim 15, wherein the silane coupling agent is present in an amount from 0.01 to 10 percent by weight, based on the total weight of the composition.

17. The composition according to claim 11, further comprising an organic solvent.

18. A method of preparing a curable composition, said method comprising the step of mixing:

(A) 100 parts by weight of a silphenylene polymer having the general formula:

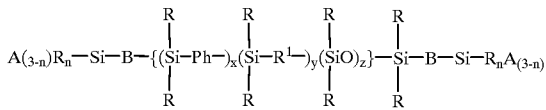

wherein each R is independently a monovalent hydrocarbon group free of aliphatic unsaturation and having 1 to 10 carbon atoms; Ph is a substituted or unsubstituted phenylene group; $R^1$ is an alkylene group having 2 to 10 carbon atoms or an alkyleneoxyalkylene group; A is a hydrolyzable group or a hydroxy group; B is an alkylene group having 2 to 10 carbon atoms, an alkyleneoxyalkylene group, or an oxygen atom; n is an integer from 0 to 2; x is an integer having a value of at least 1; y is an integer having a value of at least 0; and z is an integer having a value of at least 0;

(B) 1 to 90 parts by weight of an organosilane selected from the group consisting of an organosilane having the formula $R^2_e SiY_{4-e}$ and a partially hydrolyzed condensate thereof, wherein each $R^2$ is independently a monovalent hydrocarbon group, Y is a hydrolyzable group, and e is an integer from 0 to 2; and (C) a cure accelerating catalyst in an amount sufficient to cure the composition.

19. The method according to claim 18, wherein the step of mixing components (A), (B), and (C) is carried out in an organic solvent.

* * * * *